US012658538B2

(12) United States Patent
Hartl

(10) Patent No.: US 12,658,538 B2
(45) Date of Patent: Jun. 16, 2026

(54) HOUSING PART FOR AN ELECTRICAL STORAGE INSTALLATION, AND ELECTRICAL STORAGE INSTALLATION

(71) Applicant: Schott AG, Mainz (DE)

(72) Inventor: Helmut Hartl, Klosterneuburg (AT)

(73) Assignee: SCHOTT AG, Mainz (DE)

( * ) Notice: Subject to any disclaimer, the term of this patent is extended or adjusted under 35 U.S.C. 154(b) by 775 days.

(21) Appl. No.: 18/083,015

(22) Filed: Dec. 16, 2022

(65) Prior Publication Data

US 2023/0198111 A1　　Jun. 22, 2023

(30) Foreign Application Priority Data

Dec. 16, 2021　(DE) ..................... 10 2021 133 391.1

(51) Int. Cl.
| | |
|---|---|
| *H01M 50/55* | (2021.01) |
| *H01G 11/74* | (2013.01) |
| *H01G 11/80* | (2013.01) |
| *H01M 50/566* | (2021.01) |

(52) U.S. Cl.
CPC ............ *H01M 50/55* (2021.01); *H01G 11/74* (2013.01); *H01G 11/80* (2013.01); *H01M 50/566* (2021.01)

(58) Field of Classification Search
CPC ............................ H01M 50/547; H01M 50/55
See application file for complete search history.

(56) References Cited

U.S. PATENT DOCUMENTS

| | | | |
|---|---|---|---|
| 961,672 | A | 6/1910 | Barnhurst |
| 5,773,959 | A | 6/1998 | Merritt et al. |

| | | | |
|---|---|---|---|
| 5,849,434 | A | 12/1998 | Miura et al. |
| 5,853,914 | A | 12/1998 | Kawakami |
| 5,874,185 | A | 2/1999 | Wang et al. |
| 5,900,183 | A | 5/1999 | Kronfli et al. |
| 5,952,126 | A | 9/1999 | Lee et al. |
| 9,490,469 | B2 | 11/2016 | Kim et al. |

(Continued)

FOREIGN PATENT DOCUMENTS

| | | |
|---|---|---|
| CN | 207233790 U | 4/2018 |
| DE | 10 2014 016 601 A1 | 5/2016 |

(Continued)

OTHER PUBLICATIONS

"Handbook of Batteries", David Linden, Editor, 2nd edition, published by McGrawhill, 1995, chapters 36 and 39 (88 pages).

*Primary Examiner* — Amanda C. Walke
(74) *Attorney, Agent, or Firm* — TAYLOR & EDELSTEIN, PC

(57) ABSTRACT

A housing part for an electrical storage installation includes: a main body including a through-opening, which includes a side; fixing material; a first connector terminal assembly including a connector pin which is routed through the through-opening and, by way of the fixing material, is fixed so as to be electrically isolated in the through-opening, the connector pin including a projecting part which on the side projects beyond the through-opening; an insulation material; and a terminal pad on the side, the terminal pad including an opening, the projecting part engaging in the opening and being electrically connected to the terminal pad, the pad by way of the insulation material being fastened so as to be electrically isolated on the main body.

23 Claims, 4 Drawing Sheets

(56) References Cited

U.S. PATENT DOCUMENTS

| | | | | |
|---|---|---|---|---|
| 10,199,629 | B2 * | 2/2019 | Koo ..................... | H01M 50/562 |
| 10,454,079 | B2 * | 10/2019 | Hartl ...................... | H01G 11/80 |
| 2019/0237740 | A1 | 8/2019 | Koike et al. | |
| 2020/0091570 | A1 * | 3/2020 | Guen .................. | H01M 50/562 |
| 2024/0154274 | A1 * | 5/2024 | Yamamoto .......... | H01M 50/176 |

FOREIGN PATENT DOCUMENTS

| | | | |
|---|---|---|---|
| DE | 10 2017 123 278 | A1 | 4/2019 |
| EP | 2 372 815 | A1 | 10/2011 |
| EP | 3 416 213 | B1 | 3/2020 |
| WO | 2018159180 | A1 | 9/2018 |
| WO | 2020/104571 | A1 | 5/2020 |

* cited by examiner

HOUSING PART FOR AN ELECTRICAL STORAGE INSTALLATION, AND ELECTRICAL STORAGE INSTALLATION

CROSS REFERENCE TO RELATED APPLICATIONS

This claims priority to German patent application no. 10 2021 133 391.1, filed Dec. 16, 2021, which is incorporated herein by reference.

BACKGROUND OF THE INVENTION

1. Field of the Invention

The invention relates to a housing part for an electrical storage installation, in particular a battery or a capacitor, including a main body and at least one first connector terminal assembly having a connector pin which is routed through a through-opening of the main body and by way of a fixing material is fixed so as to be electrically isolated in the through-opening, wherein the connector pin on at least one side of the through-opening projects beyond the latter. A further aspect of the invention relates to an electrical storage installation which includes a housing having such a housing part.

2. Description of the Related Art

Electrical storage installations such as batteries or capacitors usually include a housing and at least one storage cell. The housing encloses the storage cell and provides connector terminals for electrically contacting the storage installation.

In the context of the present invention, batteries are understood to be single-use batteries which upon discharging can be disposed of and/or recycled, as well as rechargeable batteries. Rechargeable batteries, optionally lithium-ion batteries, are provided for various applications such as, for example, portable electronic apparatuses, mobile phones, power tools and in particular electric vehicles. The batteries may replace traditional energy sources such as, for example, lead-acid batteries, nickel-cadmium batteries or nickel-metal hydride batteries. The use of the batteries in sensors or on the internet of things is also possible.

Storage installations in the context of the present invention are also understood to be capacitors, in particular also super capacitors.

As is generally known, super capacitors, also referred to as super caps, are electro-chemical energy storage units having a particularly high power density. As opposed to ceramic capacitors, film capacitors and electrolyte capacitors, super capacitors do not have any dielectric in the conventional sense. In said super capacitors, the storage principles of static storage of electric energy are implemented in particular by charge separation in a double-layer capacitance, and the electro-chemical storage of electric energy by a charge transfer with the aid of faradaic redox in a pseudo capacitance.

Super capacitors include in particular hybrid capacitors, in particular lithium-ion capacitors. The electrolyte of the latter usually includes a solvent in which conductive salts, usually lithium salts, are dissolved. Super capacitors are optionally used in applications that require a high number of charging/discharging cycles. Super capacitors can be particularly advantageously used in the automotive sector, in particular in the field of recuperating braking energy. Of course, other applications are likewise possible and also included by the present invention.

Lithium-ion batteries have been known as storage installations for many years. Reference to this end is made, for example, to "Handbook of Batteries", David Linden, Editor, $2^{nd}$ edition, published by McGrawhill, 1995, chapters 36 and 39.

Various aspects of lithium-ion batteries are described in a multiplicity of patents.

These include, by way of example: U.S. Pat. Nos. 961,672 A1; 5,952,126 A1; 5,900,183 A1; 5,874,185 A1; 5,849,434 A1; 5,853,914 A1; and U.S. Pat. No. 5,773,959 A1.

Lithium-ion batteries, in particular for applications in an automotive environment, typically have a multiplicity of individual battery cells which are connected to one another in series. The battery cells connected to one another in series are combined so as to form so-called battery packs; a plurality of battery packs are then combined so as to form a battery module which is also referred to as a lithium-ion battery. Each individual battery cell has electrodes which are routed out of a housing of the battery cell. The same applies to housings of super capacitors.

A multiplicity of issues such as resistance to corrosion, resistance to a crash, or resistance to vibrations have to be solved in particular with a view to the application of lithium-ion batteries in the automotive environment. A further issue relates to the tightness, in particular the hermetic tightness, over a long period of time.

Moreover, with a view to a high storage density it is desirable for the proportion of passive parts, such as the housing, in the overall construction of a storage installation to be reduced. Accordingly, housings with minor material thicknesses are optional. Examples of housings for electrical storage installations, which are conceived with a view to an ideally minor construction height and minor material thicknesses, are known from DE 10 2014 016 601 A1 and WO 2020/104571 A1, for example.

In the known housings for electrical storage installations it is however disadvantageous that a deformation can arise at high internal pressures given the minor material thicknesses of the housings. Changes in terms of the shape of this type are undesirable in particular in the region of the lids on which the electrical feedthroughs and connector terminals are usually arranged.

Therefore, what is needed in the art is a housing part, in particular a lid part, which while maintaining a particularly compact construction mode is particularly pressure resistant and flexurally stiff.

SUMMARY OF THE INVENTION

Proposed is a housing part for an electrical storage installation, in particular a battery or a capacitor. The housing part includes a main body and at least one first connector terminal assembly having a connector pin which is routed through a through-opening of the main body and by way of a fixing material is fixed so as to be electrically isolated in the through-opening, wherein the connector pin on at least one side of the through-opening projects beyond the latter. Furthermore provided on at least one side of the through-opening is a terminal pad which has an opening that is configured as a through-opening or as a blind hole, wherein the projecting part of the connector pin engages in the opening and in the region of this opening is electrically connected to the at least one terminal pad and wherein the at least one terminal pad by way of an insulation material is fastened so as to be electrically isolated on the main body.

The housing part is specified to be joined with further housing parts so as to form a housing for an electrical storage installation, wherein the housing part here includes the connector terminals of the storage installation. One or a plurality of connector terminals may be provided, depending on the type of storage installation. For example, the storage installation can include two first connector terminals which in this instance can serve as a positive terminal and a negative terminal, for example. If the housing part includes only a single first connector terminal assembly, the main body of the housing part per se, or a further housing part, optionally represents a further connector terminal, for example a negative terminal or an earth terminal, respectively. In addition to the at least one first connector terminal assembly, the housing part can also have one further connector terminal assembly or a plurality of further connector terminal assemblies that differ from the first connector terminal assembly.

The at least one connector terminal assembly has a connector pin which is routed through a through-opening of the main body and by a fixing material is held so as to be electrically isolated in this through-opening. The main body, the connector pin and the fixing material here configure a metal-fixing material feedthrough in which the fixing material seals in each case in relation to the connector pin and in relation to an internal wall of the through-opening. It is advantageous here for the fixing material not to project beyond the through-opening but to terminate so as to be substantially flush with the through-opening, or to be chosen to be even somewhat shorter than the length of the through-opening.

The connection between the fixing material and the connector pin, and between the fixing material and the wall of the through-opening, is optionally hermetically tight. Hermetic tightness is in particular understood to mean that the leakage rate of helium at a pressure differential of 1 bar is optionally $<1 \cdot 10^{-7}$ mbar $\mathrm{ls}^{-1}$, particularly optionally $<1 \cdot 10^{-8}$ mbar $\mathrm{ls}^{-1}$, and most optionally $<1 \cdot 10^{-9}$ mbar $\mathrm{ls}^{-1}$.

In the first connector terminal assembly, the at least one terminal pad represents a connector region where electrical conductors can be connected to the first connector terminal assembly. A terminal pad, which is arranged on an external side of the housing part in the completed housing, thus represents a connector region where an electrical energy storing unit that includes the housing can be electrically contacted. A terminal pad, which is arranged on an internal side in the completed housing, represents a connector region to which internal components such as storage cells, for example a battery cell or a capacitor cell, can be attached.

In order for the at least one terminal pad to be able to be electrically connected to the connector pin, said terminal pad and said connector pin are arranged so as to be closely adjacent to one another. To this end, that part of the connector pin that protrudes beyond the through-opening in the main body engages in the opening in the terminal pad, irrespective of whether the opening in the terminal pad is configured as a through-opening or as a blind hole. If the opening is configured as a blind hole, said opening accordingly points in the direction of the connector pin, wherein the connector pin in this variant of embodiment is covered by the terminal pad. It is advantageously achieved as a result that the material of the connector pin is completely covered by the first connector terminal assembly and is thus shielded in particular in relation to environmental influences or in relation to the media present in the interior of the housing.

Moreover, this arrangement facilitates precise positioning of the at least one terminal pad during production, because the connector pin, like a positioning aid, ensures accurate positioning of the terminal pad.

In order for a positive connection between the at least one terminal pad and the connector pin to be enabled, it is optional for the connector pin to protrude beyond the through-opening and thus beyond the main body by at least 0.1 mm to 2 mm, particularly optionally 0.2 mm to 1 mm.

The at least one first connector terminal assembly can have exactly one terminal pad. In one advantageous embodiment of the first connector terminal assembly, the terminal pad is situated on an external side of the housing part in the completed housing. In an alternative advantageous embodiment of the first connector terminal assembly, the terminal pad is situated on an internal side of the housing part in the completed housing.

A particularly advantageous embodiment of the first connector terminal assembly provides that in each case one terminal pad is arranged on the external side of the housing part in the completed housing as well as on the internal side of the housing part in the completed housing. That is to say that the first connector terminal assembly can have in each case one terminal pad on both sides of the through-opening, and thus on both sides of the housing part. In this case, it is optional for the connector pin on both sides of the through-opening to project beyond the latter, and for terminal pads to be arranged on both sides of the through-opening, said terminal pads in each case having one opening, wherein the projecting part of the connector pin engages in each case in the respective opening and in the region of this opening is electrically connected to the respective terminal pad.

The at least one terminal pad is electrically connected to the connector pin. This connection can simultaneously also represent a mechanical connection such that the at least one terminal pad is not only fastened to the main body by way of the insulation material, but is also fastened to the connector pin. The insulation material is optionally an electrically isolating adhesive, or an electrically isolating potting material.

Epoxy resins are particularly suitable if the insulation material is an adhesive. Moreover, the adhesive can also be embodied in the form of an adhesive tape, in particular of a double-sided adhesive tape. Thermoplastic material or thermosetting plastics material is particularly suitable as potting material.

There may be different or identical insulation materials for external or internal terminal pads, respectively. This enables the adaptation to different requirements as a function of the position of the terminal pads.

Specific selection criteria are to be met when selecting a suitable adhesive, in particular a suitable epoxy resin, or a suitable potting material, as described below.

Since methods such as soldering/brazing or welding may be used when assembling the housing part, or the storage installation, for example when establishing a connection between the connector pin and the terminal pad and/or a connection between the terminal pad and connectors such as terminal lugs, it is advantageous for the adhesive to be capable of withstanding thermal stress so as to be able to at least briefly resist the temperatures required for soldering/brazing or welding. It is advantageous for the adhesive to be able to be at least briefly heated to temperatures of more than 150° C., optionally at least 220° C., without the adhesive evaporating or degenerating, i.e. any significant variation in terms of the initial adhesive force arising. The term "briefly" in this context is understood to be a period of at least 1 min to 5 min.

With a view to the customary operation and potential accidents/malfunctions in the use of an electrical storage installation it may alternatively be advantageous for the adhesive to be permanently thermally stable up to at least 80° C., optionally up to at least 100° C. The adhesive is optionally permanently thermally stable in the range from −40° C. to +120° C., advantageously in the range from −40° C. to +150° C.

According to one variant of the present invention, adhesives which in terms of the thermal resistance combine both properties, e.g. are permanently thermally stable from −40° C. to +150° C., and briefly withstand thermal stresses of more than 150° C., are optional.

Besides the permanent and/or brief thermal stability, the adhesive should moreover have good resistance in relation to external influences, in particular in relation to liquids, aerosols and/or gases. Depending on the side of the housing part on which the terminal pad is situated in the completed housing, a difference may be made here between moisture resistance, or climatic resistance or weather resistance, and chemical resistance, e.g. resistance in relation to battery electrolytes.

With a view to the fastening of a terminal pad which is arranged on an external side of the housing part in the completed housing, it is advantageous for the adhesive to pass a temperature-air humidity test. For this purpose, a unit composed of a housing part having a connector terminal assembly according to the invention with a terminal pad adhesively bonded thereto is placed in a climatic chamber and exposed to a temperature of 85° C. and a relative air humidity of 85% for 1000 h, for example. The unit is subsequently subjected to mechanical stresses, in particular weight and flexural stresses, in order to test to what extent the initial adhesive force is still present. The test is considered successfully passed when the adhesive still has at least 80% of its initial adhesive force after the test.

With a view to the fastening of a terminal pad which is arranged on an internal side of the housing part in the completed housing, it is advantageous for the adhesive to have an adequate resistance to electrolyte, resistance in relation to conductive salts, etc. In order for the resistance to be determined, the adhesive can be submerged in a medium to be tested for 20 days at 60° C., and the medium can subsequently be analyzed for component parts which have been extracted from the adhesive. The extraction is a measure for the resistance in relation to the respective medium. Furthermore, visible changes to the adhesive and/or to the medium, for example changes in color, may also provide information pertaining to the resistance.

Since other conditions prevail on the internal side of the housing part than on the external side, different adhesives, in particular epoxy resins, can in each case be used on the inside and the outside in order for the terminal pads to be fastened.

However, an adhesive which is suitable for the use on the external side of the housing part as well as for the use on the internal side of the housing part is optional.

The selection criteria mentioned also apply in analogous manner to an electrically isolating potting material.

The at least one terminal pad, while using an adhesive or while using a potting material as an insulation material, is optionally fastened across the entire area so as to be electrically isolated on the main body.

Alternatively, the terminal pad, while using an adhesive or while using a potting material as an insulation material, can also be fastened only partially, i.e. on parts of the area thereof, so as to be electrically isolated on the main body.

Sufficiently reliable fastening can also be implemented in this way. It is advantageous herein for adhesive, or potting material, respectively, to be situated on the external peripheries between the terminal pad and the main body, such that no accessible gap remains between the components mentioned.

The at least one first connector terminal assembly leads to the housing part being reinforced already when one terminal pad is arranged, as a result of which said housing part is subjected to only minor deformations in particular when impinged with pressure. The insulation material and the terminal pad or terminal pads, respectively, here are optionally designed and arranged in such a manner that the at least one first connector terminal assembly, conjointly with the main body, in the region of the through-opening has a flexural strength that is at least double the flexural strength of the main body without the first connector terminal assembly.

Furthermore, the arrangement of the terminal pad on one side and in particular on both sides protects the metal-fixing material feedthrough of the connector pin. The connector pin is protected mechanically in relation to environmental influences such as shocks or the like in particular in the case of an embodiment on both sides. External mechanical influences are absorbed and transmitted to the housing by the insulation material and the terminal pad.

The insulation material used for connecting the terminal pad or the terminal pads is optionally arranged and configured in such a manner that the insulation material completely covers the fixing material. As a result of the fixing material being covered by the insulation material, said fixing material is advantageously protected not only in relation to mechanical influences but also in relation to moisture or the effect of other substances.

The at least one terminal pad is optionally arranged and specified in such a manner that the connector pin does not protrude beyond the opening of the at least one terminal pad. It is achieved as a result, in particular when the opening is configured as a through-opening, that the connection face provided by the terminal pad is not disturbed by protruding parts, and even large terminal lugs or electrical conductors can be readily connected to the terminal pad, for example.

A shape of the opening of the at least one terminal pad optionally corresponds to a cross-sectional shape of the connector pin, wherein the size of the opening is optionally chosen so as to be larger by 0.02 mm to 0.1 mm than the corresponding size of the connector pin. It is achieved as a result that a gap between the at least one terminal pad and the connector pin is as small as possible and a reliable electrical connection between the two can be easily established. At the same time however, it is made possible that production tolerances are compensated for such that the connector pin can always reliably engage in the opening of the terminal pad without the latter being damaged or deformed. The remaining gap can be further reduced or even completely closed by deforming the terminal pad and/or the connector pin after the arrangement thereof on the main body. As a result, the electrical connection can also be directly established or at least improved.

A connection between the connector pin and the at least one terminal pad is optionally embodied as a conductive adhesive connection or a welded connection. Soldering/brazing is also conceivable in order for an electrically conductive connection to be achieved. In the case of an opening configured as a through-opening, the connection optionally runs along the contour of the opening of the at least one terminal pad. In the case of an opening configured as a blind hole, the connection is optionally designed across the full area.

For example, laser welding, resistance welding, ultrasonic welding or friction welding can be used in order for a welded connection to be configured.

The at least one terminal pad advantageously provides a significantly enlarged connector face in relation to the cross-sectional face of the connector pin. The establishing of the metal-fixing material feedthrough can advantageously take place separately from the arrangement and the connection of the at least one terminal pad such that the connector faces provided for electrical contacting can be readily adapted to the housing part by adapting the shape and size of the terminal pad depending on the requirement, without the metal-fixing material feedthrough having to be modified or adapted. The shape of an external terminal pad here can be chosen independently of a shape of an internal terminal pad such that optimum shapes and arrangements for the electrical contacting can be chosen in each case.

The at least one terminal pad here optionally has a shape which is selected from round shapes such as circles or ellipses, or selected from polygonal shapes such as rectangles, squares, triangles or hexagons, in each case optionally having radiused corners. In principle, the shape of the at least one terminal pad can be chosen so as to be adapted according to the requirement.

The dimensions of the terminal pads of the first connector terminal assembly, thus the width and the length thereof, are optionally chosen in such a manner that a large face for welding or soldering/brazing connectors such as terminal lugs is provided. Alternatively, connections may also be riveted or press-fitted for fastening. These dimensions may be substantially larger than the connector faces provided solely by customary connector pins. In this way it is advantageously achieved that the shape and size of connector regions on which electrical connections are established can be adapted in a customer-specific manner, without the actual electrical feedthrough of the connector pin through the housing part having to be adapted or modified. Angular shapes can in particular also be readily generated.

Adhesion of the insulation material may be impeded on smooth surfaces. In order for the adhesion of the insulation material to the at least one terminal pad and/or to the main body to be improved, it is optional for structures to be provided on the respective surfaces of the terminal pad and/or of the main body that are adjacent to the insulation material, the respective surface being roughened by said structures, and/or undercuts in which the insulation material can interlock being created by said structures.

The main body, at least in a connection region in which the main body is connected to the at least one terminal pad, and/or the at least one terminal pad on the side facing the main body, optionally has a microstructure. Adhesion of the insulation material is improved by this microstructure, and a strength of the connection between the at least one terminal pad and the main body is increased in this way.

The microstructure can in particular be a multiplicity of flutes and/or depressions which may be constructed and generated in a manner similar to the microstructures known from DE 10 2017 123 278 A1. In order for the adhesion of the insulation material to be improved, the depth of the microstructures is optionally chosen so as to be somewhat larger than for the microstructures for controlling the flux of a metallic solder material described in said publication.

The depressions of the microstructure are optionally laser-structured regions in the surface of the main body and/or of the terminal pad. These laser-structured regions can advantageously be laser-eroded regions and/or thermally locally formed regions by laser radiation and/or locally formed regions by laser-induced action of pressure. Of course, any combinations are possible.

Alternatively or additionally, other methods for producing the microstructure can be used, such as, for example, the embossing by microstructured dies and/or material-subtracting methods such as grinding and/or engraving etc.

The microstructure advantageously has the shape of channels and/or the microstructure includes or is composed of depressions having round and/or oval diameters. Rectangular diameters, in particular having radiused corners, are likewise possible. The depressions are particularly advantageously in the shape of craters and/or pots. These shapes can be particularly favorably generated by laser erosion.

The depressions of the microstructures optionally have a depth of at least 1 $\mu$m, particularly optionally of at least 10 $\mu$m, and particularly advantageously of at least 100 $\mu$m. Up to a depth of 200 $\mu$m, the depressions are referred to as microstructures. The depth is measured from the plane of the surface of the main body outside the microstructure down to the deepest point of the microstructure, i.e. in the case of crater-shaped depressions, for example, from the plane of the surface of the main body outside the microstructure down to the deepest point of the base of the crater.

The main body and/or the at least one terminal pad optionally have/has depressions or structures with at least one undercut into which the insulation material engages in order to connect the main body to the at least one terminal pad.

For example, flutes that run obliquely thereto can be incorporated in the surfaces of the main body and/or the terminal pad. It is also conceivable for the periphery of the at least one terminal pad to be folded inward in such a manner that an encircling channel is configured as an undercut.

The material for the at least one terminal pad is optionally a metal with good electrical conductivity. The material of the at least one terminal pad is composed of or includes optionally a material selected from aluminium, aluminium alloys, copper and copper alloys, in particular brass and bronze. Moreover, it is conceivable that so-called contact materials are selected as the material for the at least one terminal pad. The contact materials are distinguished by a good resistance in relation to oxidation and are also resistant in relation to wear and tear by sparks and arcs. Suitable contact materials include in particular silver, gold and platinum. Suitable alloys as a contact material include in particular silver-nickel and silver-tin oxide.

The first connector terminal assembly can be readily obtained in various ways. First, the electrical feedthrough through the main body is configured. To this end, a main body, a blank for the fixing material, and the connector pin can be provided, for example, and a metal-fixing material feedthrough can be obtained in a temperature treatment step. As a result of corresponding dimensions and of the arrangement of the connector pin, the latter on one or on both sides projects beyond the through-opening in the main body and on these sides can then be connected to a, or the, terminal pad(s), respectively.

In one variant, the terminal pads are obtained by stamping from a sheet-metal material which is already coated with the insulation material, in particular an adhesive. The terminal pad is then positioned above the projecting part of the connector pin and pressed onto the main body.

Alternatively thereto, it is, of course, possible to stamp the terminal pads from a non-coated sheet metal, and for an adhesive to be applied to the latter and/or to the main body only shortly prior to the arrangement of the terminal pad.

In order for a potting material to be used as the insulation material, the housing part and the terminal pad can be placed into an injection mold. The insulation material is subsequently injected into the mold.

The housing part furthermore optionally includes at least one second connector terminal assembly in which one connector region is formed by the elevation in the main body or by a further terminal pad which is connected in an electrically conductive manner to the main body. As a result, it is possible for a connector region to be provided on the housing part, in particular a connector region configured as an earth terminal or a negative terminal, without an electrical feedthrough through the main body being present.

In the alternative embodied as an elevation, no further construction element is advantageously required for configuring the second connector terminal assembly. Savings in terms of material and weight are thus made in particular. The elevation is optionally obtained by way of forming the main body, in particular by way of thrust-forming.

The at least one second connector terminal assembly permits a connection point, in particular for an earth connector, to be provided, said connection point in optional variants of embodiment not requiring any further parts and nonetheless providing the same construction height as the first connector terminal assembly. An electrical connection to the second connector terminal assembly can thus be designed in the same way as the electrical connection to the first connector terminal assembly. Moreover, as a result of the elevation and optionally the corresponding depression on the opposite side, a wall which serves as a corrugation is obtained, this leading to a mechanical reinforcement of the housing part without additional material.

During the thrust-forming, the part of the main body that is to be configured as the elevation is displaced vertically in relation to the remaining part of the main body, a variation in terms of the wall thickness of the main body arising only in a transition region between these parts. As a result, the surface qualities remain unchanged in particular. Of course, other forming methods, such as deep-drawing, can of course also be used.

If a further terminal pad is used for forming the second connector terminal assembly, said terminal pad is optionally connected to the main body by welding, soldering/brazing or adhesive bonding using an electrically conductive adhesive. The further terminal pad is optionally designed so as to be similar or identical to one of the terminal pads of the first connector terminal assembly. Furthermore, it is conceivable for a further terminal pad to be arranged not only on an external side but also on the opposite internal side of the housing part.

An overall height of the at least one first connector terminal assembly and of the at least one second connector terminal assembly are optionally chosen so as to be identical. As a result, the regions provided for electrical contacting all are situated at the same height in relation to the surface of the main body so that all connections can be mechanically produced in the same way. Besides the height, other geometric parameters, in particular the shape and size of the second connector terminal assembly, are optionally adapted to the first connector terminal assembly and optionally chosen so as to be identical.

The overall height of the connector terminal assemblies, thus of the at least one first connector terminal assembly as well as of the optionally present at least one second connector terminal assembly, proceeding from a surface of the main body, is optionally chosen to be in the range from 10% to 80% of the wall thickness of the main body. This permits in particular that the second connector terminal assembly is configured as an elevation by thrust-forming as the forming method.

The material of the main body is selected according to the requirement, wherein a material which can be readily joined to the further housing parts is optionally selected. The material of the main body is optionally selected from a metal, in particular iron, iron alloys, iron-nickel alloys, iron-nickel-cobalt alloys, KOVAR, steel, high-grade steel, aluminium, aluminium alloys. AlSiC, magnesium, magnesium alloys, titanium or titanium alloys.

Owing to their low weight, light metals such as aluminium, magnesium and titanium, and alloys thereof, are particularly optional here.

The material of the connector pin is optionally selected from a metal with good electrical conductivity. Accordingly, the material of the connector pin is optionally selected from copper, a copper alloy, aluminium, an aluminium alloy, iron, an iron alloy, an iron-nickel alloy, an iron-nickel-cobalt alloy, KOVAR, titanium, a titanium alloy, steel, stainless steel, high-grade steel, AlSiC, magnesium or a magnesium alloy.

The fixing material for holding and insulating the connector pin in the through-opening of the main body is optionally selected from glass, glass ceramics, or ceramics. The fixing material here is optionally selected in relation to the material of the main body and of the connector pin such that a metal-fixing material feedthrough is configured.

In order to obtain particularly good sealing between the metal parts, thus the main body and the connector pin of the at least one first connector terminal assembly, and the fixing material, the feedthrough can be configured in the form of a compression glass-to-metal seal. A thermal expansion coefficient of the main body here is chosen so as to be greater than a thermal expansion coefficient of the fixing material such that, after a thermal treatment in which the fixing material is glazed in the through-opening, the main body contracts more intensely than the fixing material. As a result, compression forces are permanently exerted by the main body on the fixing material. These compressive forces preload the fixing material and ensure a particularly durable seal.

Accordingly, it is optional for a thermal expansion coefficient of the main body to be greater than a thermal expansion coefficient of the fixing material. In the case of a compression glass-to-metal seal, the thermal expansion coefficient of the main body is particularly optionally chosen so as to be at least 5%, optionally at least 10%, particularly optionally at least 20%, and most optionally at least 50%, greater than the thermal expansion coefficient of the fixing material.

As an alternative to an embodiment as a compression glass-to-metal seal, an adapted feedthrough, in which the thermal expansion coefficients of the main body, of the fixing material and of the connector pin are mutually adapted, may also be used. Adapted here is understood to mean that the expansion coefficients differ substantially by at most $2*10^{-6}$ 1/K, in particular by at most $1*10^{-6}$ 1/K, in particular are substantially identical, and/or optionally lie in the range of 3 to $7*10^{-6}$ 1/K, optionally 4.5 to $5.5*10^{-6}$ 1/K, or in the range of $9*10^{-6}$ 1/K to $11*10^{-6}$ 1/K. Overall, the expansion coefficients can thus lie in the range of 3 to $11*10^{-6}$ 1/K. To the extent that reference is made to the thermal expansion coefficient in the context of the present application, this is understood to mean the linear thermal expansion coefficient α in the range of 20-300° C.

In order to simplify joining of the housing part to further housing component parts, the housing part optionally has an encircling connection flange.

The housing part furthermore optionally includes at least one functional element which is selected from a safety valve or a filler opening. Such a safety valve can be provided as, for example, a predetermined breaking point or as a weakened portion of the housing part, wherein the predetermined breaking point, or the weakened portion, respectively, is configured and arranged in such a manner that said predetermined breaking point or said weakened portion fail in a targeted manner at a predefined pressure, thus enabling a positive pressure to escape from the interior of a housing formed with the housing part.

The housing part is optionally configured as a lid of a housing. A housing for an electrical storage installation can be configured by joining the lid to a housing body. This electrical storage installation can include one or a plurality of electrical storage cells, for example battery cells or capacitor cells.

Accordingly, what is also needed in the art is an electrical storage installation, in particular a battery or a capacitor which includes one of the housings, or housing parts, respectively, described herein and at least one storage cell. The present invention provides this.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
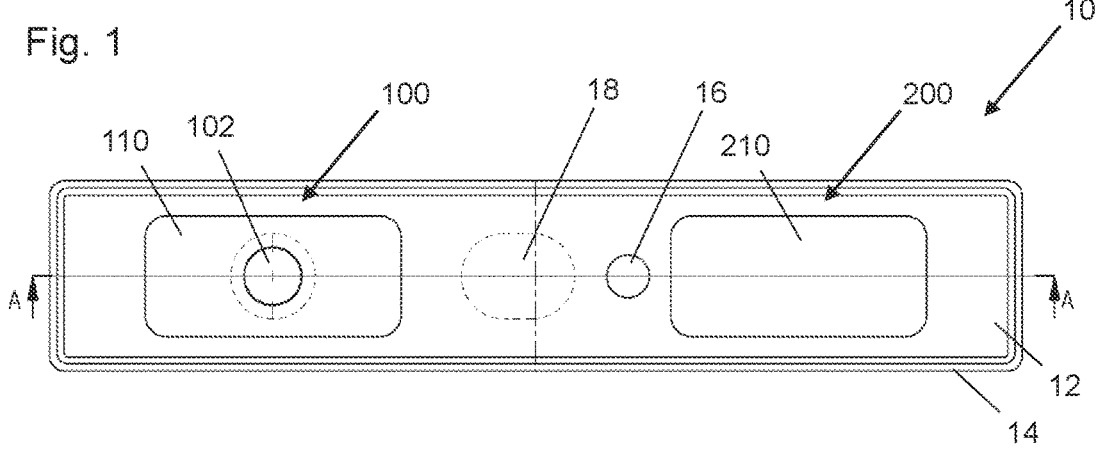
FIG. 1 shows a view onto a lower side of a housing part designed as a lid.

Illustrated in a view from below in FIG. 1 is an exemplary embodiment of a housing part 10 designed as a lid. The housing part 10 in this exemplary embodiment has a main body 12 having a first connector terminal assembly 100 and a second connector terminal assembly 200. When the housing part 10 is connected to one or a plurality of electrical storage cells, for example a battery cell or a capacitor cell, the first connector terminal assembly 100 can serve as a positive terminal, for example, and the second connector terminal assembly 200 can serve as a negative terminal, for example.

The housing part 10, in addition to the connector terminal assemblies 100, 200, can have even further functional elements. To this end, a safety installation in form of a safety valve 18 and a filler opening 16 are provided in the example illustrated in FIG. 1. The safety valve 18 can be designed as a predetermined breaking point in the housing part 10, for example, wherein the safety valve is specified in such a manner that the latter opens at a defined pressure. After all parts of the housing have been assembled, the interior can be filled with a liquid or gaseous medium, for example with an electrolyte, by way of the filler opening 16. The filler opening 16 is usually closed after filling.

An encircling connection flange 14 for connecting to further housing parts is provided in the example illustrated in FIG. 1. This connection flange 14 can be configured as a welding flange, for example.

Figure 2:
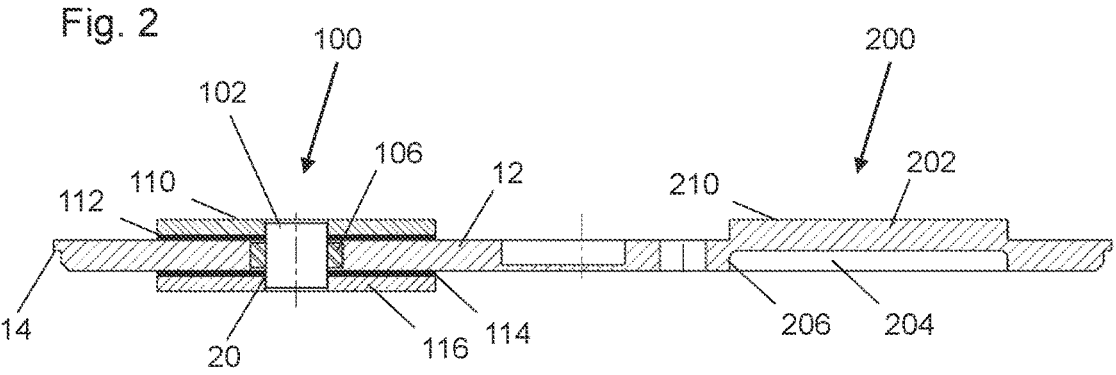
FIG. 2 shows a sectional view of the housing part along the section line marked in FIG. 1.

FIG. 2 shows the housing part of FIG. 1 in a sectional illustration viewed from the side along the section line marked A-A in FIG. 1. The construction of the first connector terminal assembly 100 and of the second connector terminal assembly 200 can in each case be readily seen in this sectional illustration.

Figure 3:
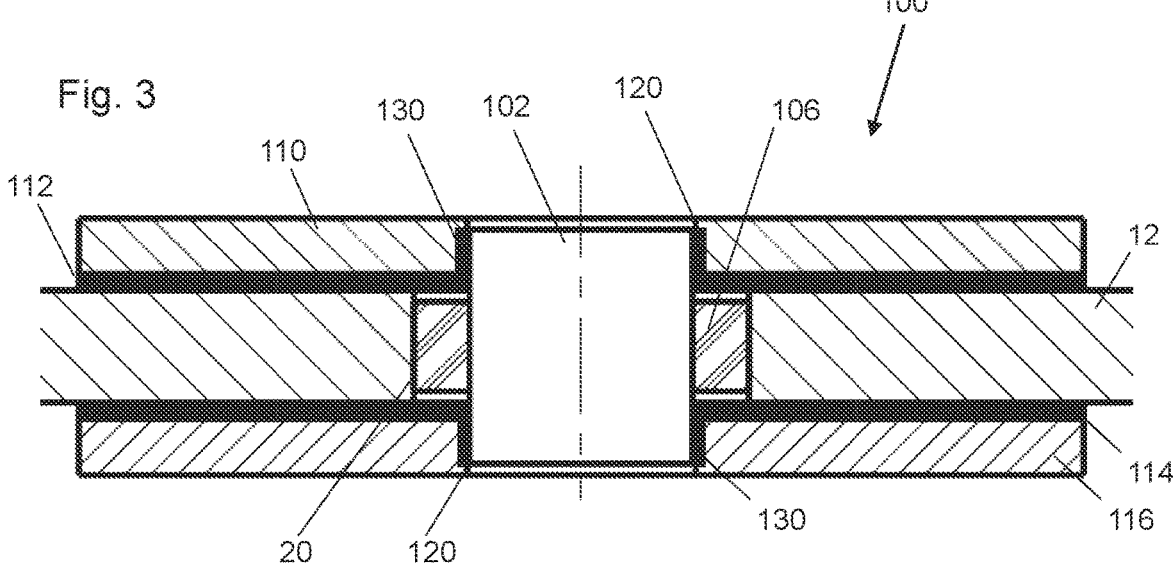
FIG. 3 shows an enlarged view of a first connector terminal assembly of the lid part.

The first connector terminal assembly 100, which is illustrated enlarged in FIG. 3, includes a connector pin 102 which is inserted into a through-opening 20 of the main body 12 and is held by way of a fixing material 106. The fixing material 106 here also electrically isolates the connector pin 102 in relation to the main body 12. The connector pin 102 in the example illustrated projects beyond the main body 12, or the through-opening 20, respectively, both on an upper side as well as on a lower side.

A terminal pad 110, which is fastened to the main body 12 by way of an insulation material 112, for example an adhesive, is arranged on the upper side of the main body 12. The terminal pad 110 has an opening 120 in which the connector pin 102 engages. To this end, the opening 120 has the substantially identical shape as the cross section of the connector pin 102, wherein the opening 120 is optionally embodied so as to be somewhat larger such that the connector pin 102 can engage in this opening 120 even in the case of potential production tolerances arising. The connector pin 102 is in physical contact with the terminal pad 110, or there is only a minor gap therebetween, such that an electrical connection between the two can be established by a welded connection 130. A welded connection 130 of this type is optionally configured along a contour of the opening 120. After the housing has been assembled, the terminal pad 110 is situated on the exterior such that said terminal pad 110 can serve as connector region for electrical contacting.

Arranged on the lower side of the main body 12 in the example illustrated in FIGS. 2 and 3 is an inner terminal pad 116 which by way of an inner insulation material 114 is fastened to the lower side of the main body 12. The inner terminal pad 116 also has an opening 120 in which the connector pin 102 engages. The connector pin 102 is also electrically connected to the inner terminal pad 116 along the contour of the opening 120, for example by way of a welded connection 130. After the housing has been assembled, the inner terminal pad 116 is situated in the interior of the housing such that said inner terminal pad 116 can serve as a connector region for storage cells received in the interior of the housing. For example, terminal lugs of storage cells can be connected to the terminal pad, said terminal lugs being able to be welded in particular.

The dimensions of the insulation material 112, 114 in the example illustrated in FIGS. 1 to 3 are adapted to the dimensions of the terminal pad 110, 116 such that the insulation material 112, 114 is completely covered. Alternatively, for example in order for an insulation barrier or creepage distance (German "Kriechstrecke") to be enlarged, it is possible for the dimensions of the insulation material 112, 114 to be enlarged such that part of the insulation material 112, 114 protrudes beyond the terminal pads 110, 116, this by way of example being schematically illustrated in FIGS. 8 and 9.

The second connector terminal assembly 200 is likewise illustrated in FIG. 2. The second connector terminal assembly 200 on an external side of the housing part 10 has an elevation 202 which is provided by a connector region 210. The second connector terminal assembly 200 on the opposite, inner side has a corresponding depression 204. The wall 206 of the depression, which is formed in the process, in a manner similar to a corrugation contributes towards reinforcing the housing part 10. The elevation 202 is optionally designed in such a manner that the height of the second connector terminal assembly 200 corresponds to the overall height of the first connector terminal assembly 100, thus to the thickness of the insulation material 112 and to the thickness of the terminal pad 110. Furthermore, the dimensions, thus the length and the width, of the connector region 210 are optionally chosen such that said dimensions correspond to the dimensions of the terminal pad 110. In this instance, the first connector terminal assembly 100 and the second connector terminal assembly 200 advantageously have the same height in relation to the main body 12 and the same dimensions such that electrical contacting is facilitated.

The second connector terminal assembly 200 is optionally obtained by forming the material of the main body 12. The forming is optionally performed by thrust-forming in which the region of the elevation 220 is vertically displaced. A modification of the material thickness of the main body 12 here takes place only in a transition region such that the material thickness in the region of the elevation 202 is identical to the material thickness of the main body 12 outside the second connector terminal assembly 200.

Figures 4, 5:
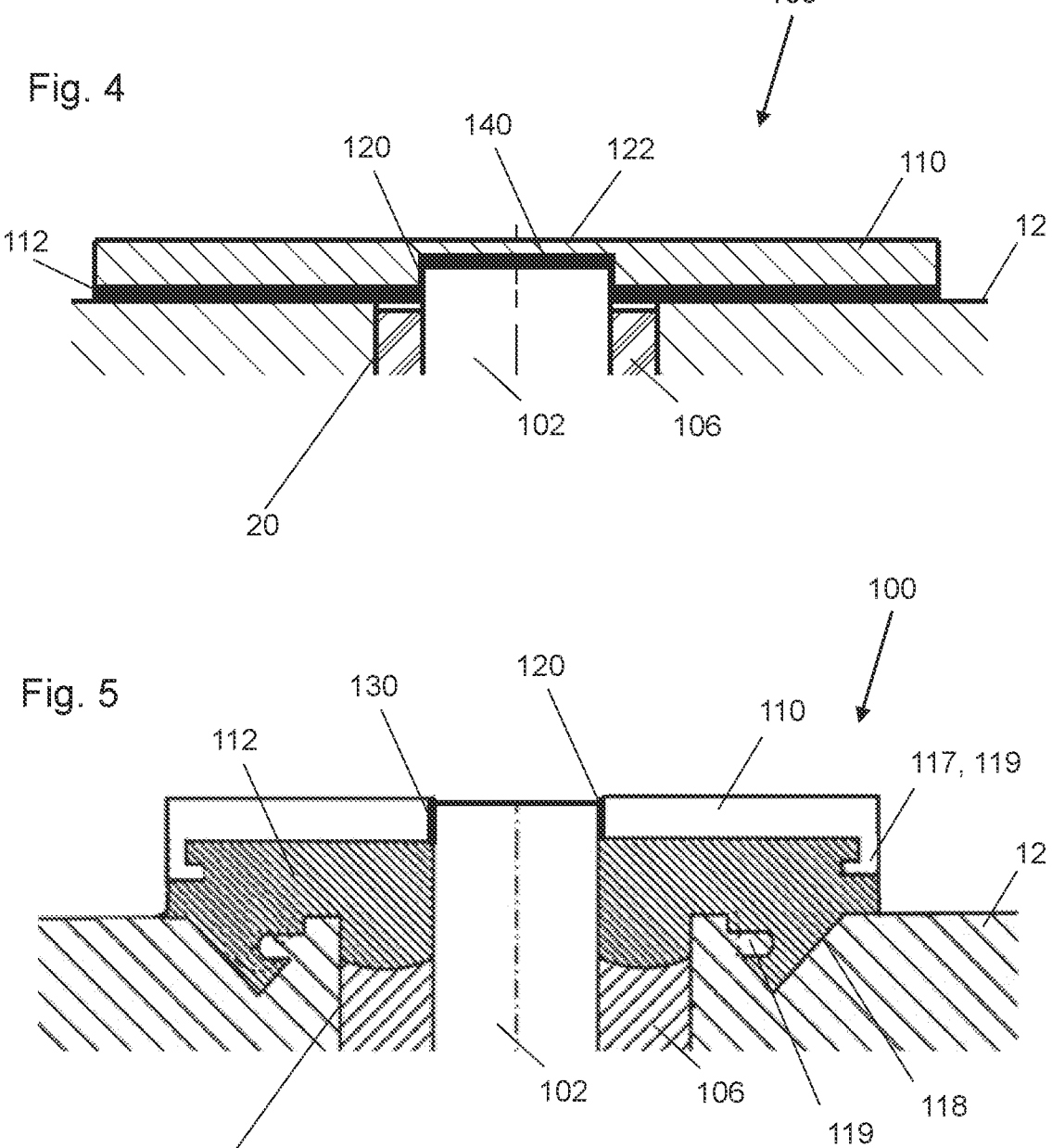
FIG. 4 shows a second example of a first connector terminal assembly.
FIG. 5 shows a third example of a first connector terminal assembly.

FIG. 4 shows a second exemplary embodiment of the first connector terminal assembly 100. As has already been described with reference to FIGS. 1 to 3, the first connector terminal assembly 100 includes an electrical feedthrough in which the connector pin 102 is held in the through-opening 20 of the main body 12 by way of the fixing material 106. The fixing material 106 moreover seals the connector pin 102 and the wall of the through-opening 20 such that the feedthrough is tight. The feedthrough is optionally embodied so as to be hermetically tight.

As opposed to the first exemplary embodiment illustrated in FIGS. 1 to 3, the terminal pad 110 has an opening 120 which is designed as a blind hole and in which a part of the connector pin 102 that projects beyond the through-opening 20 engages. A conductive adhesive 140 is incorporated in the region of the blind hole for the electrical connection between the connector pin 102 and the terminal pad 110. An electrically isolating adhesive is used as the insulation material 112 in the remaining regions between the terminal pad 102 and the main body 12, in order for the terminal pad 102 to be fixed to the main body 12.

As can be seen in the illustration of FIG. 4, no joint is created here in the region of the connector pin 102 and a surface of the terminal pad 110, such that a continuous planar connection face is provided. The connector pin 102 and the fixing material 106 are completely covered by the terminal pad 110, wherein the terminal pad 110 in the region of the opening 120 configured as a blind hole has a thinned region 140 with a reduced wall thickness.

Figures 6, 7:
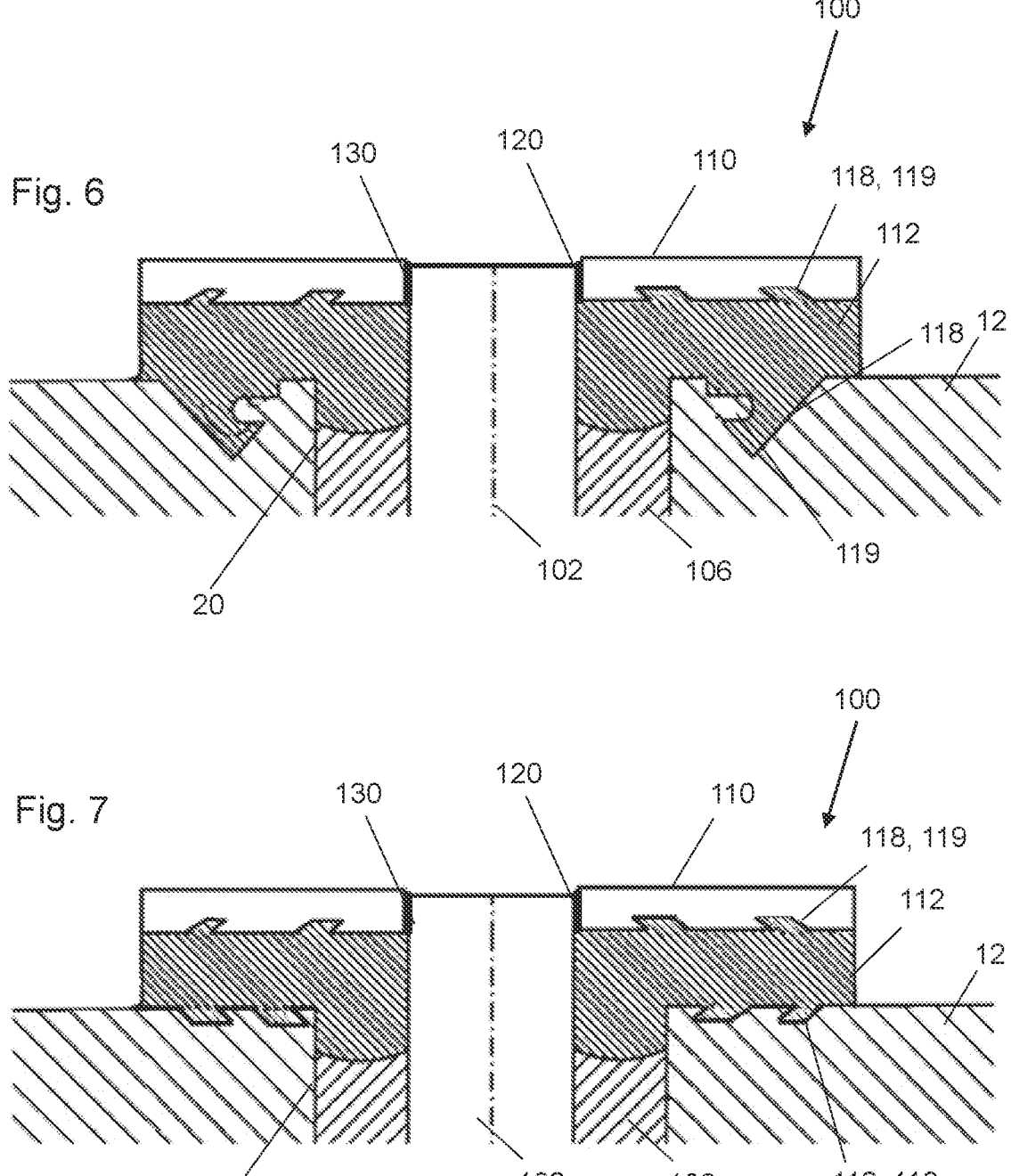
FIG. 6 shows a fourth example of a first connector terminal assembly.
FIG. 7 shows a fifth example of a first connector terminal assembly.

FIGS. 5, 6 and 7 show three further exemplary embodiments of the first connector terminal assembly 100. The main body 12 and the electrical feedthrough formed by the connector pin 102 and the fixing material 106 are designed as has been described with reference to the preceding embodiments. That part of the connector pin 102 that projects beyond the through-opening 20 in the main body 12 is electrically connected to the terminal pad 110 by a welded connection 130, as described with reference to the first embodiment of FIGS. 1 to 3.

However, as an alternative for connecting the terminal pad 110 and the main body 12, a potting material, for example a thermoplastic material or thermosetting plastics material, is used as the insulation material 112 in the first connector terminal assembly 100 of FIGS. 5, 6 and 7. Undercuts 119 are in each case provided so that the insulation material 112 can readily connect to the main body 12 and to the terminal pad 110.

In the third exemplary embodiment illustrated in FIG. 5, a depression 118 which encircles the opening 20 and has an undercut 119 in the form of an encircling projecting elevation within the depression 118 is arranged in the main body 12. A collar 117, which represents an encircling undercut 119, is configured by folding back the periphery on the terminal pad 110.

In the fourth exemplary embodiment illustrated in FIG. 6, a depression 118 which encircles the opening 20 and has an undercut 119 in the form of an encircling projecting elevation within the depression 118 is again arranged in the main body 12. A plurality of depressions in the form of oblique flutes are arranged on the terminal pad 110, said oblique flutes as a result of their embodiment likewise configuring an undercut 119.

In the fifth exemplary embodiment illustrated in FIG. 7, depressions 118 in the form of oblique flutes are in each case configured on the main body 12 as well as on the terminal pad 110, said oblique flutes providing in each case an undercut 119 as a grip for the insulation material 112.

Alternatively or additionally to the flutes and depressions illustrated in FIGS. 5 to 7, the surfaces of the terminal pad 110 and of the main body 12 that face the insulation material 112 can be provided with a microstructure. As a result, many depressions and/or flutes which offer the insulation material 112 a grip are arranged.

Figures 8, 9, 10:
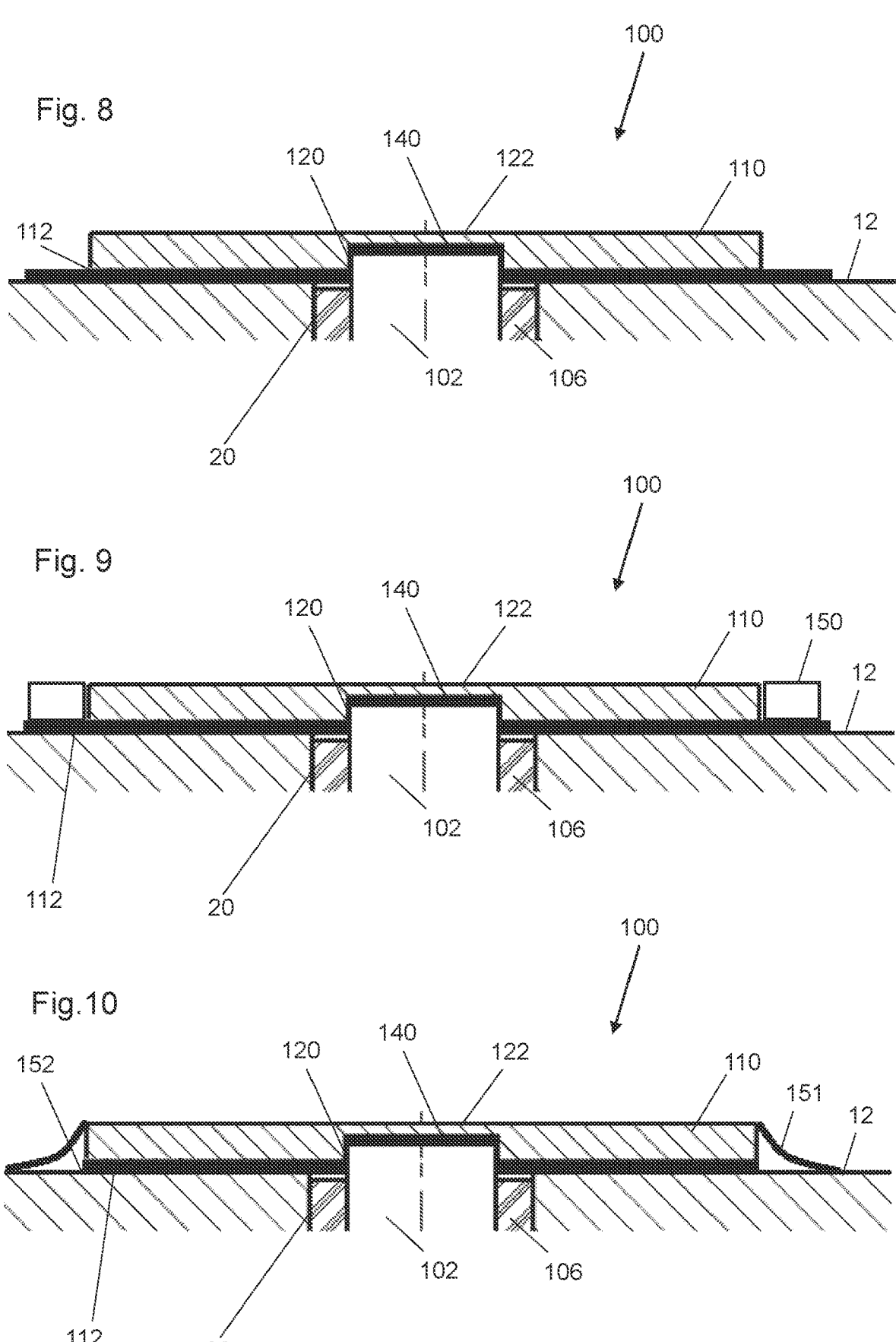
FIG. 8 shows a first variant of FIG. 4.
FIG. 9 shows a second variant of FIG. 4.
FIG. 10 shows a third variant of FIG. 4.

FIGS. 8 to 10 show measures for enlarging the insulation barrier or creepage distance on the periphery of the terminal pad 110. These measures by way of example here are illustrated for the second example of a first connector terminal assembly 100 (cf. FIG. 4). Of course, said measures are not limited to embodiments of terminal pads having an opening 120 designed as a blind hole, but can also be combined with other examples of a first connector terminal assembly, in particular with embodiments corresponding to FIGS. 1 to 3.

The external dimension of the insulation material 112 in the first variant for lengthening the insulation barrier illustrated in FIG. 8 is chosen so as to be larger than the external dimension of the terminal pad 110 such that part of the insulation material 112 protrudes beyond the terminal pad 110.

Alternatively or additionally to a protruding part of the insulation material 112, a further insulation element 150, which laterally surrounds the terminal pad 110, can be provided in the peripheral region of the terminal pad 110. In the second variant for lengthening the insulation barrier illustrated in FIG. 9, the further insulation element 150 is fastened to the protruding insulation material 112, for example adhesively bonded to the latter, so as to be laterally next to the terminal pad 110.

FIG. 10 shows a third variant for lengthening the insulation barrier in an embodiment in which the insulation material 112 is completely covered by the terminal pad 110. An isolating creepage distance extension or insulation barrier extension 151 which covers the joint 152 between the main body 12 and the terminal pad 110 is provided for lengthening the insulation barrier. In order for the insulation barrier extension 151 to be provided, an "adhesive bead" from insulation material can be placed around the terminal pad 120 in an additional operative step after the terminal pad 110 has been fastened to the main body 12, for example. Alternatively, the insulation material below the terminal pad 110 can at least be partially of a thicker configuration, and/or an additional adhesive bead can be provided in the peripheral region below the terminal pad 110, for example, such that material is peripherally squeezed out while the terminal pad 110 is being fastened to the main body 12, as a result configuring the insulation barrier extension on the joint 152.

The claims are not limited to the exemplary embodiments described herein. A multiplicity of variations are possible, in particular, in which individual features of the exemplary embodiments described herein are combined with one another.

LIST OF REFERENCE SIGNS

10 Housing part
12 Main body
14 Connection flange
16 Filler opening
18 Safety installation
20 Through-opening
A Section line
100 First connector terminal assembly
102 Connector pin
104 Through-opening
106 Fixing material
110 Terminal pad
112 Insulation material
114 Inner insulation material
116 Inner terminal pad
117 Collar
118 Depression
119 Undercut
120 Opening
122 Thin region
130 Welded connection
140 Conductive adhesive
150 Further insulation element
151 Insulation barrier extension
152 Joint
200 Second connector terminal assembly
202 Elevation
204 Thrust-formed indentation
206 Wall of thrust-formed indentation 210 Connector region While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A housing part for an electrical storage installation, the housing part comprising:
a main body including a through-opening, which includes at least one side;
a fixing material;
at least one first connector terminal assembly including a connector pin which is routed through the through-opening of the main body and, by way of the fixing material, is fixed so as to be electrically isolated in the through-opening, the connector pin including at least one projecting part which on the at least one side of the through-opening projects beyond the through-opening;
an insulation material; and
at least one terminal pad on the at least one side of the through-opening, the at least one terminal pad including an opening that is configured as a through-hole or as a blind hole, the at least one projecting part of the connector pin engaging in the opening and, in a region of the housing part corresponding to the opening, being electrically connected to the at least one terminal pad, the at least one terminal pad by way of the insulation material being fastened so as to be electrically isolated on the main body, wherein at least one of (a) at least one of the main body and the at least one terminal pad have/has a plurality of depressions or a plurality of structures with at least one undercut into which the insulation material engages in order to connect the main body to the at least one terminal pad, and (b) the insulation material includes an adhesive, the at least one terminal pad, while using the adhesive as the insulation material, being fastened so as to be electrically isolated on the main body.

2. The housing part according to claim 1, wherein the at least one side of the through-opening is a first side, the at least one projecting part is a first projecting part, the at least one terminal pad is a first terminal pad, the opening is a first opening, wherein the housing part further comprises a second terminal pad, the through-opening including a second side, the connector pin including a second projecting part which on the second side of the through-opening projects beyond the through-opening, the second terminal pad being arranged on the second side of the through-opening, the second terminal pad including a second opening, the second projecting part of the connector pin engaging in the second opening and, in a region of the housing part corresponding to the second opening, being electrically connected to the second terminal pad.

3. The housing part according to claim 2, wherein the first terminal pad and the second terminal pad are composed of a material selected from aluminium, aluminium alloys, copper, copper alloys, silver, gold, platinum and silver alloys.

4. The housing part according to claim 1, wherein the insulation material includes an adhesive or a potting material, the at least one terminal pad, while using the adhesive or the potting material as the insulation material, being fastened across an entire area so as to be electrically isolated on the main body.

5. The housing part according to claim 1, wherein the insulation material completely covers the fixing material.

6. The housing part according to claim 1, wherein the at least one terminal pad is arranged and specified in such a manner that the connector pin does not protrude beyond the opening of the at least one terminal pad.

7. The housing part according to claim 1, wherein a shape of the opening of the at least one terminal pad corresponds to a cross-sectional shape of the connector pin.

8. The housing part according to claim 1, further comprising a conductive adhesive connection, a welded connection, or a soldered/brazed connection which connects the connector pin and the at least one terminal pad.

9. The housing part according to claim 1, wherein the at least one terminal pad has a shape that is selected from a plurality of round shapes or from a plurality of polygonal shapes.

10. The housing part according to claim 1, wherein at least one of (i) the main body, at least in a connection region in which the main body is connected to the at least one terminal pad, and (ii) the at least one terminal pad, on a side of the at least one terminal pad facing the main body, has a microstructure.

11. The housing part according to claim 1, further comprising at least one second connector terminal assembly including a connector region which is formed (i) by an elevation in the main body or (ii) by an additional terminal pad which is connected in an electrically conductive manner to the main body.

12. The housing part according to the claim 11, wherein the elevation has been obtained by forming the main body.

13. The housing part according to claim 11, wherein an overall height of the at least one first connector terminal assembly and of the at least one second connector terminal assembly are identical.

14. The housing part according to claim 13, wherein the overall height of the at least one first connector terminal assembly and the at least one second connector terminal assembly, proceeding from a surface of the main body, is in a range from 10% to 80% of a wall thickness of the main body.

15. The housing part according to claim 1, wherein a material of the main body is a metal.

16. The housing part according to claim 1, wherein the fixing material is selected from a glass, glass ceramics, or ceramics.

17. The housing part according to claim 1, wherein a material of the connector pin is selected from copper, a copper alloy, aluminium, an aluminium alloy, iron, an iron alloy, an iron-nickel alloy, an iron-nickel-cobalt alloy, KOVAR, titanium, a titanium alloy, steel, stainless steel, high-grade steel, AlSiC, magnesium, and a magnesium alloy.

18. The housing part according to claim 1, wherein a first thermal expansion coefficient of the main body is greater than a second thermal expansion coefficient of the fixing material.

19. The housing part according to claim 1, wherein the housing part is configured as a lid of a housing.

20. The housing part according to claim 1, wherein the at least one first connector terminal assembly, conjointly with the main body, in a region of the housing of the through-opening, has a flexural strength which is at least double a flexural strength of the main body without the first connector terminal assembly.

21. An electrical storage installation, comprising:
a housing including a housing part, the housing part including:
a main body including a through-opening, which includes at least one side;
a fixing material;
at least one first connector terminal assembly including a connector pin which is routed through the through-opening of the main body and, by way of the fixing material, is fixed so as to be electrically isolated in the through-opening, the connector pin including at least one projecting part which on the at least one side of the through-opening projects beyond the through-opening;
an insulation material; and
at least one terminal pad on the at least one side of the through-opening, the at least one terminal pad including an opening that is configured as a through-hole or as a blind hole, the at least one projecting part of the connector pin engaging in the opening and, in a region of the housing part corresponding to the opening, being electrically connected to the at least one terminal pad, the at least one terminal pad by way of the insulation material being fastened so as to be electrically isolated on the main body, wherein at least one of (a) at least one of the main body and the at least one terminal pad have/has a plurality of depressions or a plurality of structures with at least one undercut into which the insulation material engages in order to connect the main body to the at least one terminal pad, and (b) the insulation material includes an adhesive, the at least one terminal pad, while using the adhesive as the insulation material, being fastened so as to be electrically isolated on the main body; and
at least one storage cell connected to the housing part.

22. A housing part for an electrical storage installation, the housing part comprising:
a main body including a through-opening, which includes at least one side;
a fixing material;
at least one first connector terminal assembly including a connector pin which is routed through the through-opening of the main body and, by way of the fixing material, is fixed so as to be electrically isolated in the through-opening, the connector pin including at least one projecting part which on the at least one side of the through-opening projects beyond the through-opening;
an insulation material;
at least one terminal pad on the at least one side of the through-opening, the at least one terminal pad including an opening that is configured as a through-hole or as a blind hole, the at least one projecting part of the connector pin engaging in the opening and, in a region of the housing part corresponding to the opening, being electrically connected to the at least one terminal pad, the at least one terminal pad by way of the insulation material being fastened so as to be electrically isolated on the main body; and
at least one second connector terminal assembly including a connector region which is formed (i) by an elevation in the main body or (ii) by an additional terminal pad which is connected in an electrically conductive manner to the main body.

23. A housing part for an electrical storage installation, the housing part comprising:

a main body including a through-opening, which includes at least one side;

a fixing material, the fixing material being selected from a glass, glass ceramics, or ceramics;

at least one first connector terminal assembly including a connector pin which is routed through the through-opening of the main body and, by way of the fixing material, is fixed so as to be electrically isolated in the through-opening, the connector pin including at least one projecting part which on the at least one side of the through-opening projects beyond the through-opening;

an insulation material; and at least one terminal pad on the at least one side of the through-opening, the at least one terminal pad including an opening that is configured as a through-hole or as a blind hole, the at least one projecting part of the connector pin engaging in the opening and, in a region of the housing part corresponding to the opening, being electrically connected to the at least one terminal pad, the at least one terminal pad by way of the insulation material being fastened so as to be electrically isolated on the main body.

$$* \quad * \quad * \quad * \quad *$$